(12) United States Patent
Cotran et al.

(10) Patent No.: US 11,500,902 B2
(45) Date of Patent: Nov. 15, 2022

(54) METHOD, SYSTEM AND APPARATUS FOR INTERMEDIATING DATABASE UPDATES

(71) Applicant: Perry + Currier Inc., Toronto (CA)

(72) Inventors: Robert Cotran, Montreal (CA); Christina S. Lee, Toronto (CA); Thomas Andrew Currier, Toronto (CA)

(73) Assignee: PERRY + CURRIER INC., Toronto (CA)

( * ) Notice: Subject to any disclaimer, the term of this patent is extended or adjusted under 35 U.S.C. 154(b) by 79 days.

(21) Appl. No.: 16/633,852

(22) PCT Filed: Jul. 25, 2018

(86) PCT No.: PCT/IB2018/055568
§ 371 (c)(1),
(2) Date: Jan. 24, 2020

(87) PCT Pub. No.: WO2019/021223
PCT Pub. Date: Jan. 31, 2019

(65) Prior Publication Data
US 2020/0167368 A1    May 28, 2020

Related U.S. Application Data

(60) Provisional application No. 62/536,558, filed on Jul. 25, 2017.

(51) Int. Cl.
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
CPC .... G06F 16/273; G06F 16/2379; G06F 16/23; G06F 16/27
See application file for complete search history.

(56) References Cited

U.S. PATENT DOCUMENTS 7,051,022 B1 * 5/2006 Faisal ................. G06F 16/35
8,023,934 B2    9/2011 Jeide et al.
(Continued)

OTHER PUBLICATIONS

Harrison et al., CDIA Training & Test Preparation Guide 2000, Specialized Solutions, pp. 186-187.*
(Continued)

*Primary Examiner* — Cam Y T Truong
(74) *Attorney, Agent, or Firm* — Perry + Currier (57) ABSTRACT

A method in an intermediate server of initiating updates to a secondary database based on activity in a primary database includes: retrieving primary data from a primary server hosting the primary database; retrieving secondary data from a secondary server hosting the secondary database; storing a combined data set including the primary data and the secondary data; responsive to receiving a request from a client device, presenting a portion of the combined data set to the client device; receiving, from the client device, input data associated with the portion of the combined data set and updating the combined data set in the memory; determining whether to synchronize the updated combined data set with at least one of the primary server and the secondary server; and when the determination is affirmative, selecting a subset of the combined data set for transmission to at least one of the primary and secondary servers.

8 Claims, 8 Drawing Sheets

(56) References Cited

U.S. PATENT DOCUMENTS

| | | |
|---|---|---|
| 9,626,419 B2 | 4/2017 | Kothule et al. |
| 2007/0271317 A1 | 11/2007 | Carmel |
| 2008/0005106 A1* | 1/2008 | Schumacher ..... G06F 16/24556 |
| 2009/0006582 A1 | 11/2009 | Daswani et al. |
| 2019/0095517 A1* | 3/2019 | Park .................... G06F 16/2379 |

OTHER PUBLICATIONS

ISA/CA, International Search Report and Written Opinion, dated Nov. 29, 2018, re PCT International Patent Application No. PCT/IB2018/055568.

* cited by examiner

METHOD, SYSTEM AND APPARATUS FOR INTERMEDIATING DATABASE UPDATES

CROSS-REFERENCE TO RELATED APPLICATIONS

This application claims priority from U.S. Provisional Patent Application No. 62/536,558, filed Jul. 25, 2017, the contents of which is incorporated herein by reference

FIELD

The specification relates generally to database synchronization, and specifically to a method, system and apparatus for intermediating database updates.

BACKGROUND

In various environments (e.g. manufacturing, provision of professional services, etc.), multiple streams of data are maintained by distinct systems. Although discrete, such systems may nevertheless be related in that updates to one system are triggers for updates to another system. Typically, such updates are made manually by one or more human operators, an approach that is time-consuming and error-prone. Alternatively, the systems may be reconfigured to enable communication therebetween, which may undesirably increase the operational load placed on one or both of the systems under consideration.

SUMMARY

An aspect of the specification provides a method in an intermediate server of initiating updates to a secondary database based on activity in a primary database includes: retrieving primary data from a primary server hosting the primary database; retrieving secondary data from a secondary server hosting the secondary database; storing a combined data set including the primary data and the secondary data; responsive to receiving a request from a client device, presenting a portion of the combined data set to the client device; receiving, from the client device, input data associated with the portion of the combined data set and updating the combined data set in the memory; determining whether to synchronize the updated combined data set with at least one of the primary server and the secondary server; and when the determination is affirmative, selecting a subset of the combined data set for transmission to at least one of the primary server and the secondary server.

BRIEF DESCRIPTIONS OF THE DRAWINGS

Embodiments are described with reference to the following figures, in which.

DETAILED DESCRIPTION

Figure 1:
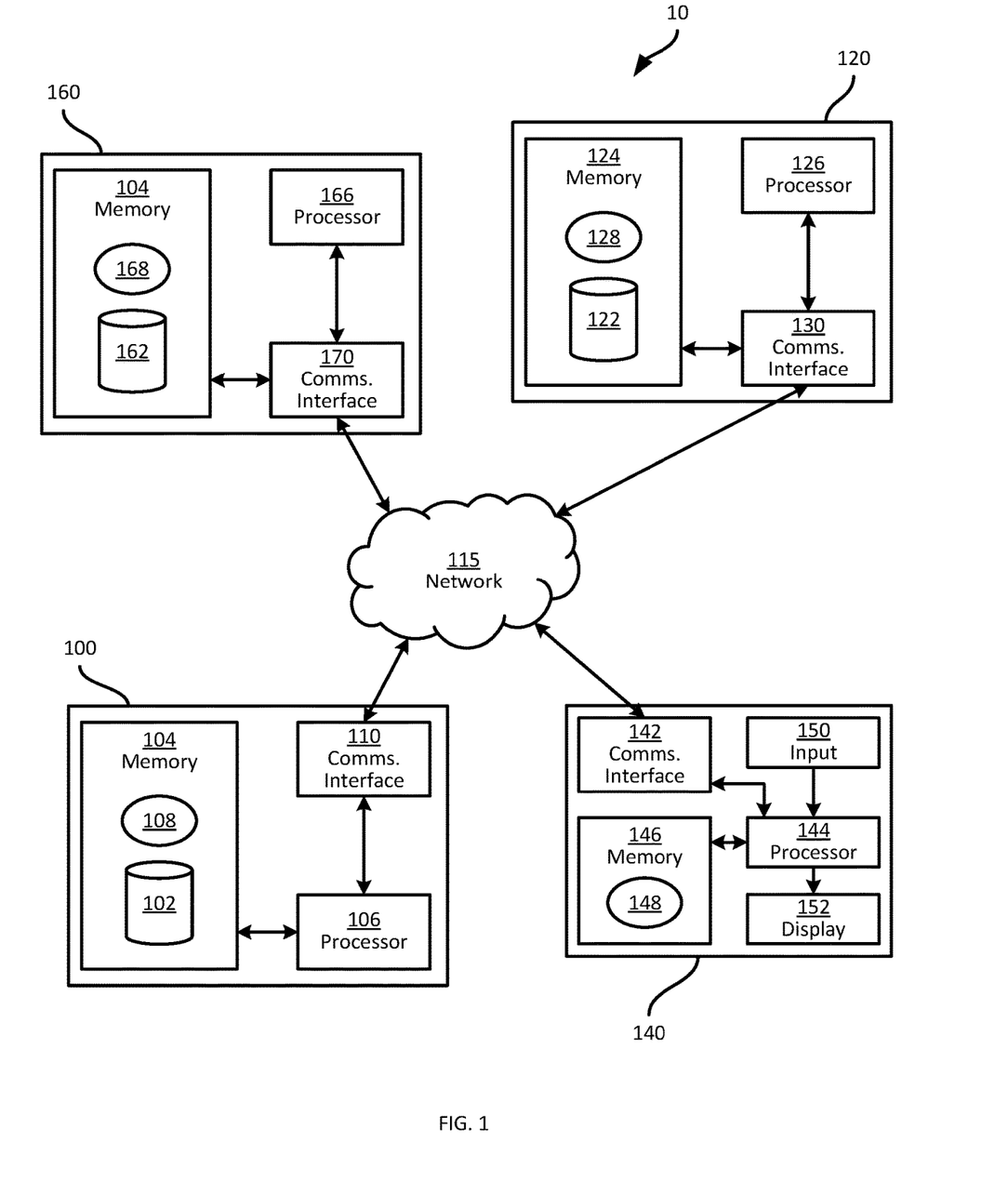
FIG. 1 depicts a system for intermediating database updates.

FIG. 1 depicts a system 10 including a primary server 100 hosting a primary database 102 stored in a non-transitory computer-readable medium such as a memory 104 thereof (e.g. any suitable combination of volatile and non-volatile memory, implemented as one or more integrated circuits, magnetic disks, or the like). The primary server 100 includes a central processing unit (also referred to herein as a processor 106 and implemented as one or more integrated circuits) connected with the memory 104. The processor 106 is configured to execute the computer-readable instructions of an application 108 stored in the memory 104 in order to perform various functions discussed herein, including hosting of the primary database 102 and interacting with other computing devices via a communications interface 110 connected to a network 115 (e.g. any suitable combination of wired and/or wireless local and wide-area networks, including the Internet). The communications interface 110 thus includes any suitable hardware components (e.g. network interface controllers, transceivers and the like) to connect the primary server 100 to the network 115.

The system 10 also includes a secondary server 120 hosting a secondary database 122 stored in a non-transitory computer-readable medium such as a memory 124 thereof (e.g. any suitable combination of volatile and non-volatile memory, implemented as one or more integrated circuits, magnetic disks, or the like). The secondary server 120 includes a processor 126 connected with the memory 124 and configured to execute the computer-readable instructions of an application 128 stored in the memory 124 in order to perform various functions discussed herein, including hosting of the secondary database 122 and interacting with other computing devices (including the primary server 100) via a communications interface 130 connected to the network 115.

In the illustrated example, the primary and secondary servers 100 and 120 are implemented as distinct servers, the components of which will be discussed in greater detail below. In other examples, however, the servers 100 and 120 can be co-located (that is, the primary and secondary databases 102 and 122 can be hosted on a single server in other examples).

The primary and secondary databases 102 and 122 can contain any of a wide variety of types of data. In general, the primary database 102 contains data that, under certain conditions (e.g. when certain updates are made to the contents of the primary database 102), is required to initiate updates to data in the secondary database 122. For example, as will be discussed in greater detail below, the primary database 102 can contain data defining a plurality of events, such as tasks related to the provision of goods and/or services (e.g. professional services, manufactured goods, or the like). The primary database 102 may therefore contain records defining the above-mentioned events, including deadlines, personnel assignments, volumes, prices, and the like.

The secondary database 122, meanwhile, can contain data defining accounting information associated with the above-mentioned events. In the examples to be discussed below, the secondary database 122 is an accounting database containing records defining amounts invoiced for the above goods and/or services, amounts paid or prepaid for such goods and/or services, expenses associated with the provision of the goods and/or services, and the like. Other examples of primary and secondary databases, in which updates to the primary database require updates to the secondary database, will also occur to those skilled in the art.

The primary database 102, in other words, contains records that may be updated periodically to reflect new tasks and to track the progress of previously created tasks. Some of the above-mentioned updates, such as those indicating the completion of a given task (e.g. the delivery of goods and/or services to a customer), require updates to the secondary database 122. For example, the delivery of goods and/or services to a customer, as reflected in the primary database 102, typically requires the storage of data in the secondary database 122 defining revenue and/or a payable balance associated with the delivered goods and/or services. In some examples, partial completion of a task as reflected in the primary database 102 may also require updating of the secondary database 122 to define one or more work-in-progress (WIP) amounts associated with the task. The primary and secondary servers 100 and 120, however, are not configured for direct communication in the present example.

Further, the updates to the secondary database 122 noted above are typically not only initiated by certain updates to the primary database 102, but also contain data from the primary database 102. For example, upon completion of the delivery of goods and/or services, as indicated in the primary database 102, it may be required to store a payable amount in the secondary database 122, with a value equal to a price defined in the primary database 102. Still further, updates to the secondary database 122 may also depend on input data received at one or more client devices, an example client device 140 of which is illustrated in FIG. 1. The client device 104 can be implemented as any suitable one of a mobile device (e.g. a smartphone, tablet computer, laptop computer or the like), a desktop computer, and the like.

The client device 140 includes a communications interface 142 (e.g. one or more transceivers, NICs, or the like) connecting the client device 140 with the primary and secondary servers 100 and 120 via the network 115. The client device 140 also includes a processor 144 interconnected with a non-transitory computer-readable medium such as a memory 146, which stores computer-readable instructions in the form of an application 148 executable by the processor 144. Execution of the application 148 configures the processor 144 to communicate with one or more of the primary and secondary servers 100 and 120. In the present example, the application 148 is a web browser application, the execution of which permits the client device 140 to interact with the servers 100 and 120 to retrieve data from, and make updates to, the databases 102 and 122. That is, the servers 100 and 120 are configured (e.g. via the execution of the applications 108 and 128, respectively), to implement web-based interfaces for interaction between the client device 140 and the databases 102 and 122. In other examples, the client device 140 can execute distinct applications stored in the memory 142 for interacting with each of the databases 102 and 122. For example, a distinct client application can be employed to view and update data from the primary database 102 via interaction with the primary server 100.

The client device 140 is configured to initiate updates to the primary database 102, for example via the receipt of input data at an input device 150 (e.g. a keyboard, touch screen, mouse, or the like) and the transmission of updates to the primary server 100 via the network 115. Such updates can indicate, for example, changes in the progress of a task (e.g. indicating the completion of a task), the creation of new tasks, and the like. The client device 140 is also configured to retrieve and present, for example via a display 152 or other suitable output device, data from the primary database 102.

The client device 140 can also be configured to update the secondary database 122 via direct interaction (over the network 115) with the secondary server 120. As noted above, however, certain updates to the secondary database 122 depend on information from both the primary database 102 and the client device 140 (i.e. information entered at the input device 150, which is not otherwise available at either of the databases 102 and 122), and may also depend on information from the secondary database 122 itself.

The system 10 therefore also includes an intermediate server 160 connected to the network 115 for communication with the servers 100 and 120, as well as the client device 140. The intermediate server 160, as will be discussed in greater detail below, is configured to retrieve data from the primary and secondary databases 102 and 122 for storage in an intermediate database 162. The intermediate server 160 is further configured to obtain input data associated with updating the secondary database 122 from the client device 140. Based on the data retrieved from the databases 102 and 122, and on the input data received from the client device 140, the intermediate server 160 is configured to effect updates to the secondary database 122 (and optionally to the primary database 102), while mitigating the impact of the above-mentioned activity on the performance of the primary and secondary servers 100 and 120.

The intermediate server includes a non-transitory computer-readable medium such as a memory 164 (e.g. any suitable combination of volatile and non-volatile memory, implemented as one or more integrated circuits, magnetic disks, or the like). The intermediate server 160 also includes a processor 166 connected with the memory 164 and configured to execute the computer-readable instructions of an application 168 stored in the memory 164 in order to perform various functions discussed herein, including hosting of the intermediate database 162 and interacting with the servers 100, 120 and the client device 140 via a communications interface 170.

Figure 2:
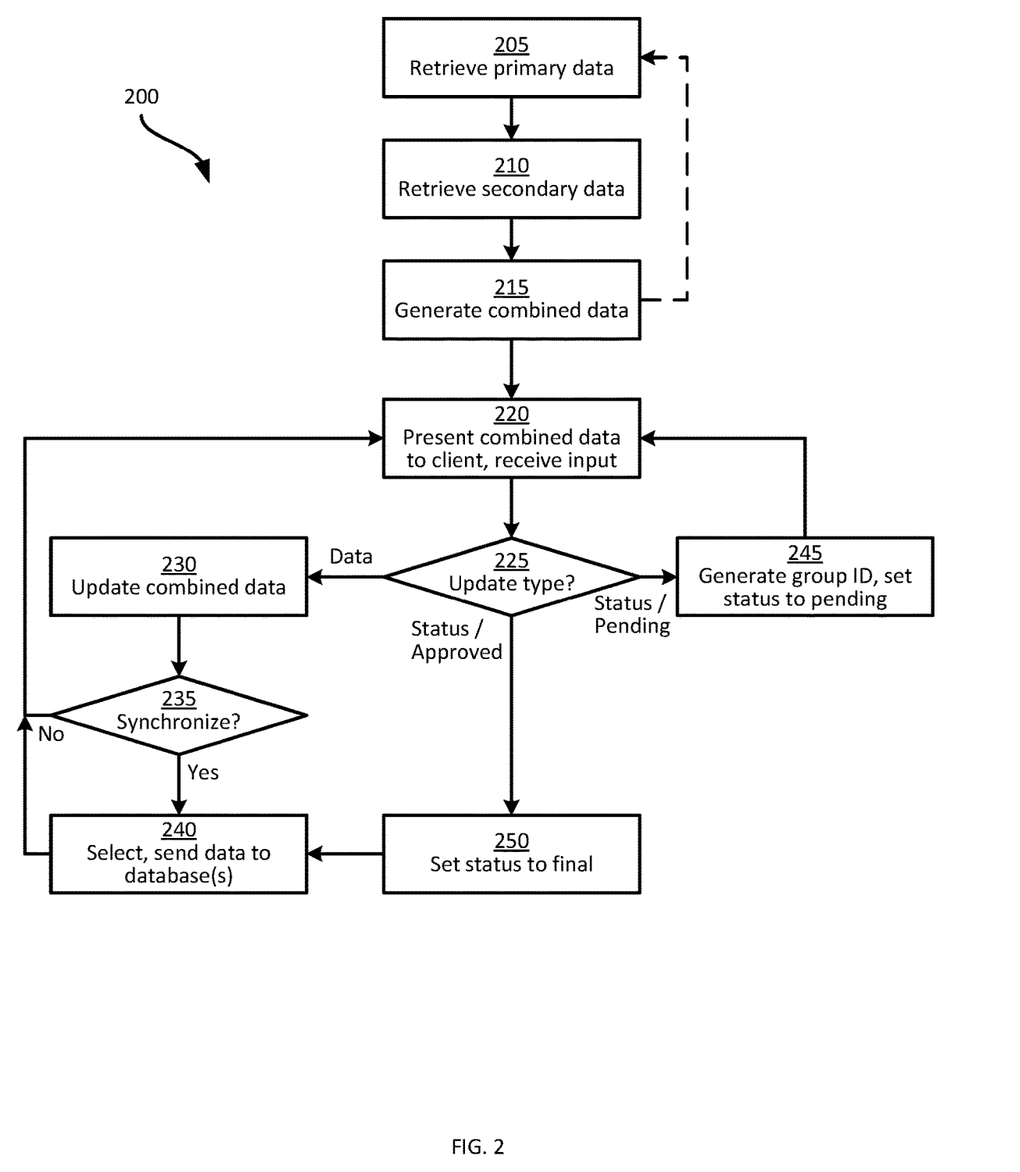
FIG. 2 depicts a method for intermediating database updates.

Turning now to FIG. 2, the operation of the system 10 will be described in greater detail. Specifically, FIG. 2 illustrates a method 200 of initiating updates to the secondary database 122. The method 200 will be described in conjunction with its performance within the system 10, and particularly by the intermediate server 160, via the execution of the application 168.

At block 205, the intermediate server 160 is configured to retrieve primary data from the primary server 100. The primary data retrieved at block 205 includes at least a set of primary records including data to be employed in the initiation of updates to the secondary database 122. In other words, the intermediate server 160 is typically configured to retrieve only a portion of the data in the primary database 102. The portion retrieved at block 205 can be defined, for example, by a set of criteria specified in the application 168. For example, the application 168 can include identifiers of fields from the database 102 to be retrieved, and can also specify criteria for when such fields are to be retrieved. For example, the intermediate server 160 can be configured to periodically query the primary server 100 to retrieve records containing the above-mentioned fields that have been updated at the primary server 100 since the previous performance of block 205.

At block 210, the intermediate server 160 is configured to retrieve secondary data from the secondary server 120. The secondary data retrieved at block 210 includes at least a set of secondary records including data to be employed in the initiation of updates to the secondary database 122. In other words, the intermediate server 160 is typically configured to retrieve only a portion of the data in the secondary database 122. As noted above in connection with block 205, the portion of the database 122 retrieved at block 210 can be defined by criteria specified in the application 168, such as identifiers of fields from the database 122 to be retrieved when such fields have been updated at the secondary database 122 more recently than the previous performance of block 210.

At block 215, the intermediate server 160 is configured to store the data retrieved from the primary and secondary servers 100 and 120 in a combined dataset in the intermediate database 162. The combined dataset includes not only the primary data retrieved at block 205 and the secondary data retrieved at block 210, but also additional data associated with the initiation of updates to the secondary database 122 but not contained in either database 102 or 122.

Figure 3:
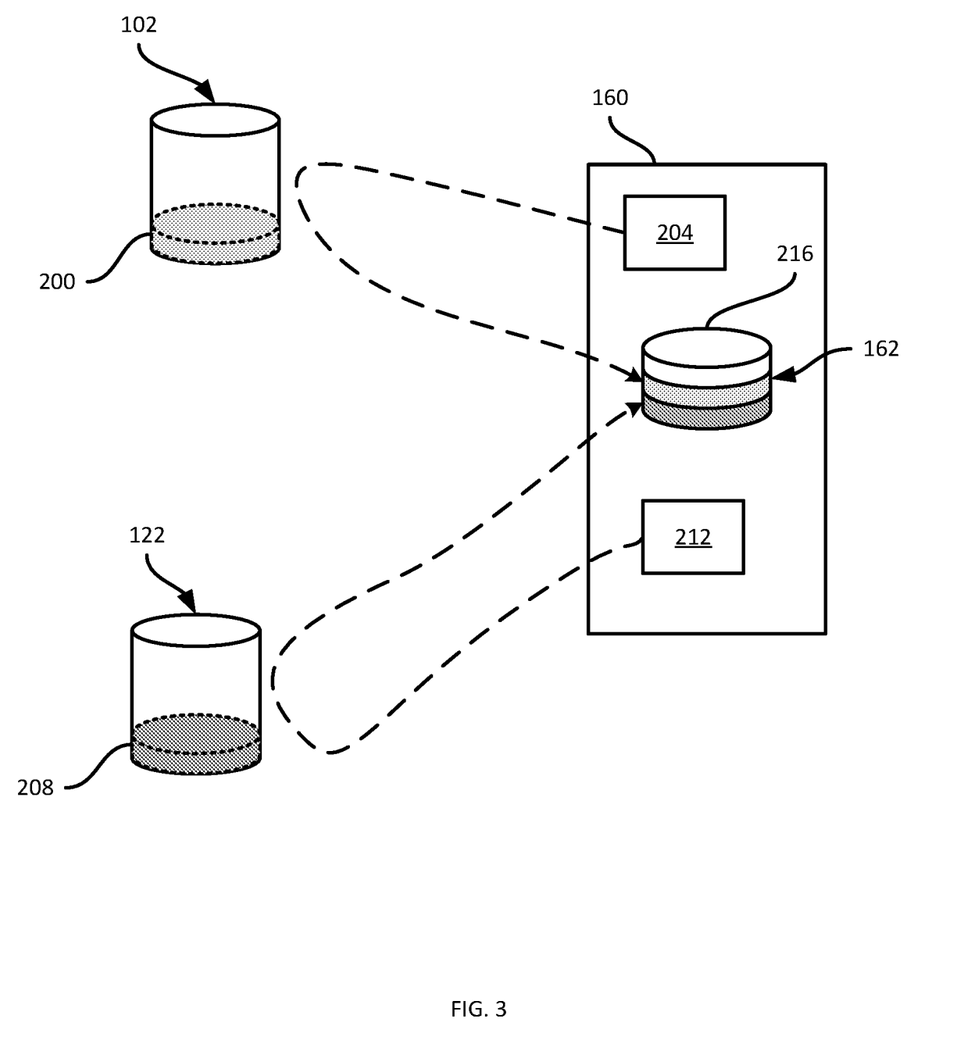
FIG. 3 depicts retrieval of data from primary and secondary databases by an intermediate server of the system of FIG. 1.

Turning to FIG. 3, an example performance of blocks 205-215 is shown. As will now be apparent, blocks 205, 210 and 215 need not be performed in exactly the order shown in FIG. 2. For example, blocks 205, 210 and 215 may be performed in parallel at a configurable interval (e.g. every five minutes, although both longer and shorter intervals are also contemplated), as indicated by the dashed line extending from block 215 to block 205.

FIG. 3 illustrates the performance of blocks 205-215 schematically. In particular, at block 205 the server 160 is configured to retrieve a portion 200 of the primary database 102 containing data corresponding to criteria 204 stored at the server 160 (e.g. specifying which records and/or fields to retrieve, a maximum age of the records, and the like). At block 210 the server 160 is configured to retrieve a portion 208 of the secondary database 122 containing data corresponding to criteria 212 stored at the server 160 (e.g. specifying which records and/or fields to retrieve, a maximum age of the records, and the like). In other words, the portions 200 and 208 of the databases 102 and 122 omit portions of the databases 102 and 122 not directly related to updating the secondary database 122 based on data in the primary database 102, and also omit data that may be directly related, but does not satisfy other criteria (e.g. data that is sufficiently aged that it is presumed to already be present in the database 162).

At block 215, the server 160 is configured to store the portions 200 and 208 in the intermediate database 162, which also includes intermediate data 216, which may also be referred to as auxiliary data (i.e. extending beyond the content of the primary data 200 and the secondary data 208). Specific examples of the primary data 200, the secondary data 208, and the combined data (including the intermediate data 216) are shown below for the purpose of illustration.

Table 1 illustrates an example set of primary data 200 retrieved at block 205. In particular, the set of primary data 200 includes a plurality of records also referred to as charge lines. Each charge line contains data for initiating an update to the secondary database 122. In the present example, in which the primary database 102 tracks the provision of goods and/or services, and the database 102 contains accounting information corresponding to such provision of goods and/or services, each charge line contains data defining at least a portion of the value of a good and/or service (i.e. the cost of the good and/or service to the customer or client).

TABLE 1

Primary Data 200

| Case ID | Client ID | Event ID | Amount |
|---------|-----------|----------|--------|
| P1234CA00 | Acme Co. | 101000 | $ 150.00 |
| P1234CA00 | Acme Co. | 102005 | $2200.00 |
| P1234CA00 | Acme Co. | 110060 | $ 400.00 |

In the example above, each charge line includes a project identifier (also referred to as a case identifier, matter identifier or the like), which corresponds to a given good or service, or to a related set of goods or services (e.g. the filing and prosecution of one patent application for a particular customer). Each charge line also includes a client identifier and an event identifier, which may also be referred to as a task identifier or work code (i.e. corresponding to a particular predefined good or service, or portion thereof, such as the payment of a maintenance fee in connection with a patent application). Each charge line also includes an amount, representing the value of the event as stored in the primary database 102. Each charge line can include various other data, not shown above for simplicity of illustration. Such other data can include a unique charge line identifier (e.g. a database key) distinguishing the particular charge line from other charge lines. The other data contained in charge lines can also include a description (e.g. a text string) of the task, an identifier of personnel that performed the task, an indication of whether the task is taxable and/or an amount of tax payable in connection with the task. Further examples of the data contained in a charge line include a number of units and a price per unit (either in addition to, or instead of, the total amount for the task shown in Table 1), a date of creation of the charge line, and the like. Still further examples include an indicator of a charge line type, such as an indicator of whether the charge line corresponds to a service fee or a disbursement (i.e. an expense paid to a third party during the provision of the goods and/or services).

Table 2 illustrates an example set of secondary data 208 retrieved at block 210. In the present example, the secondary data 208 contains a plurality of records defining prepayment amounts previously received from customers for the subsequent provision of goods and/or services. In particular, as shown below, each record in the secondary data 208 contains a customer (i.e. client) identifier, as well as a prepayment value. Each record can also contain a project identifier, although in some embodiments the project identifier can be omitted (i.e. prepayment values need not be associated with a specific project).

TABLE 2

Secondary Data 208

| Case ID | Client ID | Prepayment Amount |
|---------|-----------|-------------------|
| P1234CA00 | Acme Co. | $2100.00 |
| P1251CA00 | Acme Co. | $ 250.00 |

Each record of the secondary data 208 can also include other values not shown above, including for example a date of receipt of the corresponding prepayment, a record identifier (i.e. a database key uniquely distinguishing the record from other prepayment records) and the like.

Table 3 illustrates an example combined dataset generated at block 215, including the primary and secondary data 200 and 208, and intermediate data 216.

TABLE 3

Combined Data

| Case ID | Client ID | Event ID | Amount | Discount | Status | Prepayment |
|---------|-----------|----------|--------|----------|--------|------------|
| P1234CA00 | Acme Co. | 101000 | $ 150.00 | | WIP | $2100.00 |
| P1234CA00 | Acme Co. | 102005 | $2200.00 | | WIP | |
| P1234CA00 | Acme Co. | 110060 | $ 400.00 | | WIP | |
| P1251CA00 | Acme Co. | | | | | $ 250.00 |

As seen above, records from the primary and secondary data 200 and 208 are combined based on case identifier (i.e. project identifier). Thus, the prepayment amount for the case identifier "P1234CA00" is associated in the database 162 with the three charge line records shown in Table 1. The table structure shown above is for illustrative purposes only, and it will be apparent to those skilled in the art that a wide variety of storage structures can be employed to store the combined data. For example, the primary and secondary data 200 and 208, as well as the intermediate data 216, may remain in separate records that are associated with one another via one or more suitable key values, rather than being stored in combined records as shown above. The generation of combined data at block 215, in other words, refers generally to the process of storing associations between the primary, secondary and intermediate data 200, 208 and 216.

The intermediate data generated by the server 160, as shown in Table 3, includes a discount field associated with each charge line, and a status field associated with each charge line. In the present example, the discount and status fields are stored in the same record of the database 162 as the charge line data itself, but in other examples the intermediate data may be stored in a separate but associated record. Other examples of intermediate data generated at the intermediate server 160 rather than received from the primary or secondary servers 100 and 120 include a group identifier field (which will be discussed in greater detail below).

Returning to FIG. 2, at block 220 the intermediate server 160 is configured to present the combined dataset (or at least a portion thereof) to the client device 140, and responsive to presenting the combined dataset, to receive input data from the client device 140. The performance of block 220 need not immediately follow the performance of block 215. Indeed, numerous instances of blocks 205-215 may be performed before block 215 is invoked. In the present example, block 215 is initiated by the receipt, at the intermediate server 160, of a request for the combined data from a client device 140. For example, the client device 140 can transmit a request for a predefined uniform resource locator (URL) to the intermediate server 160 via the application 148. Prior to transmitting the request, the client device 140 may be required to authenticate with the server 160 according to any suitable authentication mechanism (e.g. the provision of a username and password and/or other authentication data).

The client device 140 can also be configured to include parameters in the above-mentioned request that define the scope of the combined data returned at block 220. For example, the request can include parameters limiting the requested data to data corresponding to one or more specific case identifiers, data corresponding to a selected date range (e.g. charge lines created in the primary database 102 between start and end dates specified by the client device 140), data associated with particular personnel, and the like. The request can also specify a status parameter, indicating that the combined data returned must have a selected value in the "status" field shown in Table 3, which will be discussed in greater detail below.

Figure 4:
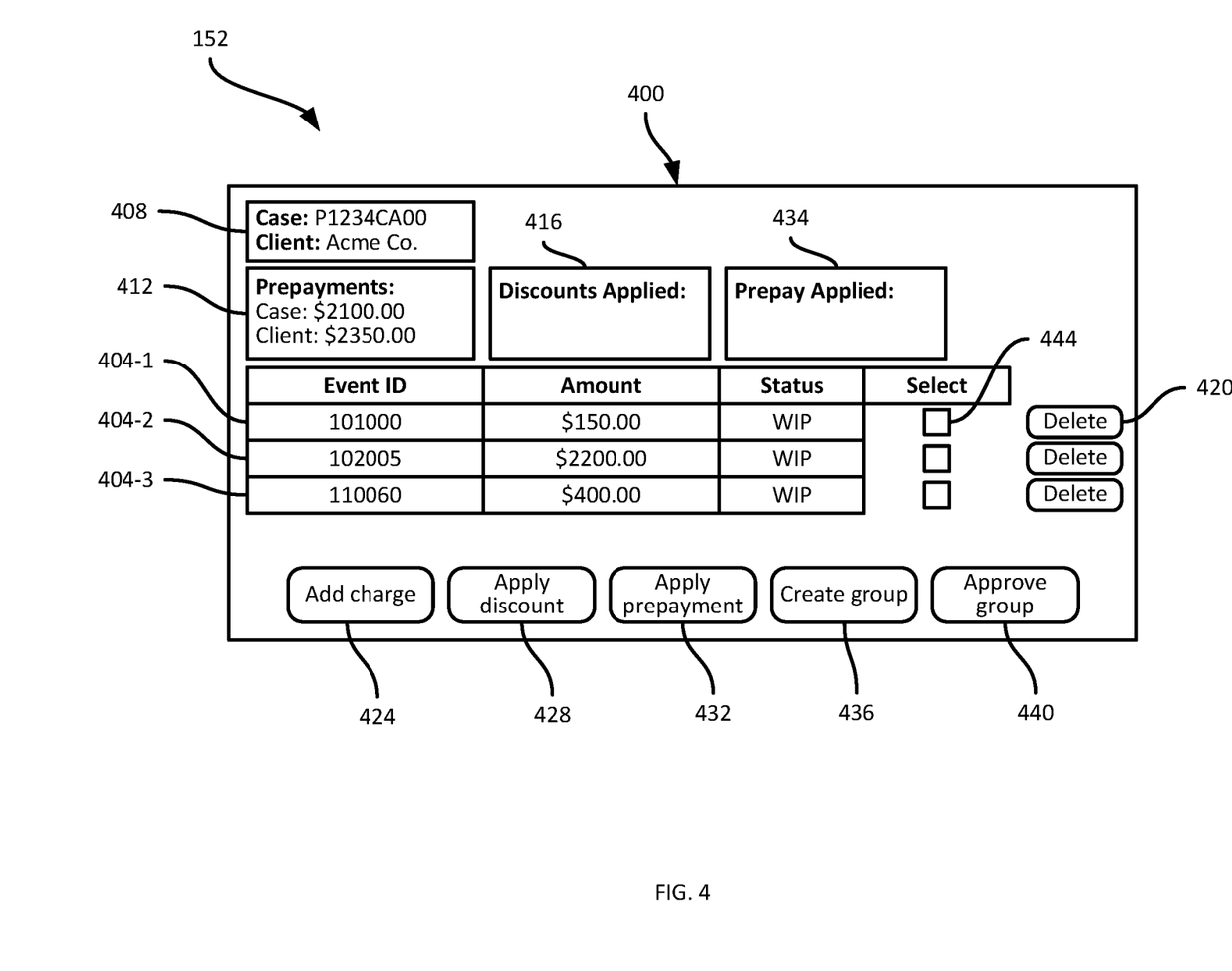
FIGS. 4-8 illustrate various updates made to the data retrieved in FIG. 3 during the performance of the method of FIG. 2.

The intermediate server 160, responsive to the above request, is configured to retrieve data from the database 162 matching the parameters of the request, and to transmit the retrieved data to the client device 140 for presentation, for example on the display 152. Turning to FIG. 4, an example graphical interface 400 generated on the display 152 is shown. The data returned to the client device 140 by the intermediate server 160 can be transmitted as a web page formatted as shown in FIG. 4, for example. Various other mechanisms for transmitting the requested data to the client device 140 and presenting the data at the client device 140 may also occur to those skilled in the art.

As shown in FIG. 4, the graphical interface 400 includes charge line elements 404-1, 404-2, 404-3 each corresponding to the charge lines represented in the database 162 (and based on the primary data retrieved at block 205). Thus, each charge line element 404 indicates an event identifier and an amount. Each charge line element 404 also includes intermediate data, in the form of a status field. Other data obtained through the performance of blocks 205-215 can also be included in the graphical interface 400, including case and client identifiers 408 and prepayment information 412. As will now be apparent, the prepayment information can include data directly corresponding to the secondary data 208 (as stored in the database 162), as well as data derived from the secondary data 208. For example, in addition to the prepayment amount of $2200.00 for the case identifier P1234CA00 retrieved from the secondary database 122, the prepayment information element 412 of the graphical interface 400 also includes a total of all prepayment amounts corresponding to the client identifier "Acme Co." in the database 162, which therefore includes the amount shown in Table 2 in association with the case identifier P1251CA00.

The graphical interface 400 also includes a discount element 416, to be discussed in greater detail below. The graphical interface 400 further includes a plurality of selectable elements for editing the combined data generated at block 215 and presented at the client device 140 via the performance of block 220. Examples of such selectable elements include a delete element 420 corresponding to each charge line element 404, selection of which deletes the corresponding data from the database 162. The selectable editing elements also include an "add charge" element 424, selection of which updates the interface 400 with an additional charge line element 404 (e.g. below the element 404-3) for completion. Certain portions of the additional charge line element, such as the "Event ID" field, can be populated by selection from a drop-down menu dynamically populated by the intermediate server 160. The drop-down menu can be dynamically populated by querying the primary server 100 to retrieve a list of active events associated with the relevant case identifier.

The selectable editing elements also include an "apply discount" element 428, selection of which generates a prompt for receiving input data defining a discount to apply to one or more charge lines. The selectable editing elements further include an "apply prepayment" element 432, selection of which generates a prompt for receiving input data defining at least a portion of the prepayment amounts shown in the element 412 to one or more charge lines. Prepayments applied to any charge lines can be reflected in a prepayment element 434 (and deducted from the available prepayment amounts shown in the element 412). The selectable editing elements also include a group creation element 436, and a group approval element 440, each of which applies a predefined value to the "status" field of one or more selected charge elements 404 (charge elements can be selected via the check boxes 444, or via any other suitable selection mechanism). The status updates, as will be discussed below in greater detail, determine when updates to the secondary database 122, and optionally to the primary database 102, are initiated. The graphical interface 400 can also include other functionality, dependent on the data stored in the database 162. For example, the database 162 can store a historical record of each charge line, and the graphical interface 400 can include, in association with each charge line element 404, a history element (not shown) that is selectable to display previous versions of a selected charge line.

As will now be apparent, the receipt of input data at block 220 includes the selection of one or more of the elements of the graphical interface 400 at the client device 140, and the receipt of input data editing the contents of a selected element. The client device 140 is configured to transmit any edited content in the graphical interface 400 to the server 160 for storage in the database 162 and subsequent processing.

Figure 5:
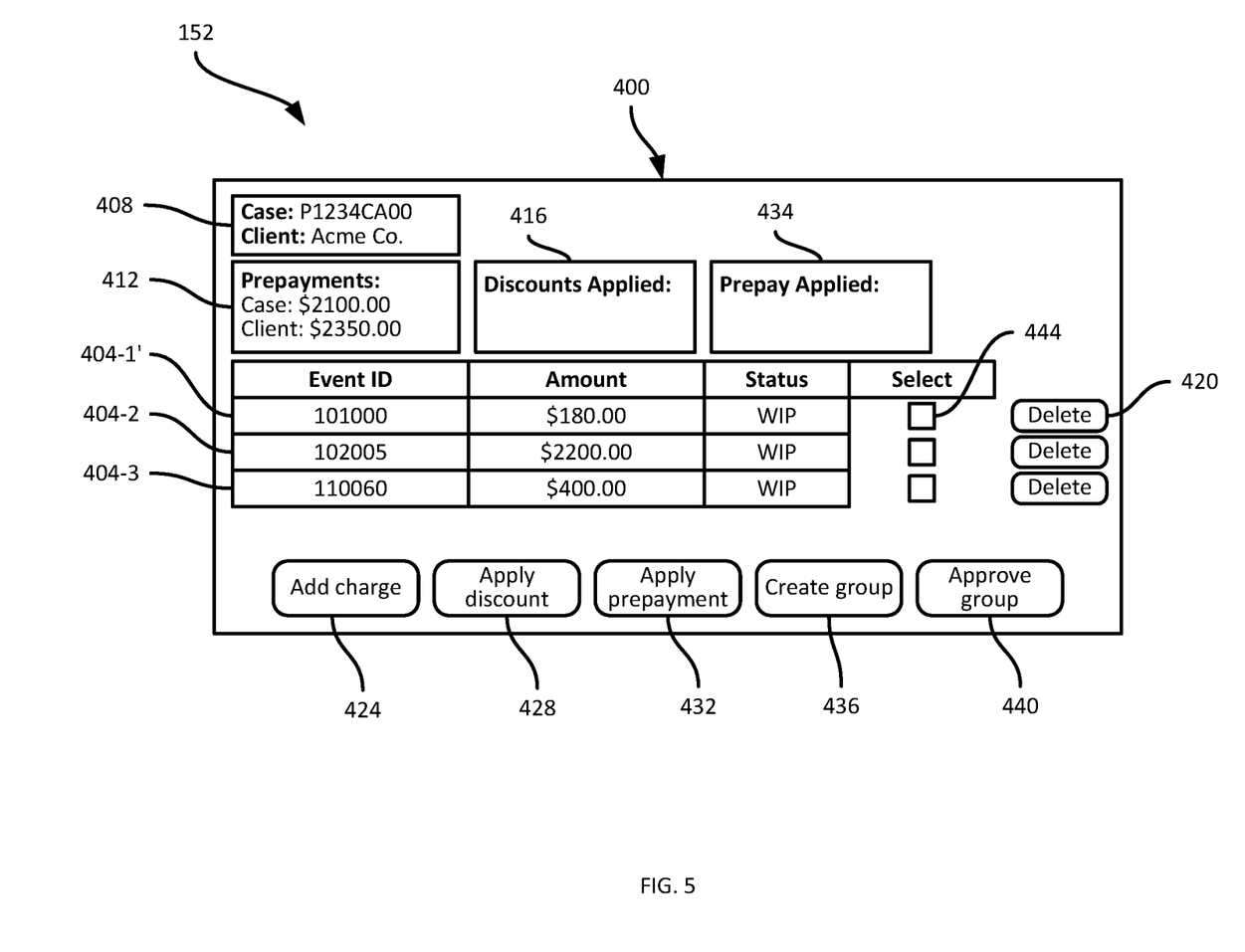

Turning to FIG. 5, for example, the graphical interface 400 is illustrated following a change to the charge line element 404-1 (now appearing as an updated charge line element 404-1') received from the client device 140. In particular, the amount associated with the charge line element 404-1' has been edited from $150.00 to $180.00. At block 225, the server 160 is configured to determine what type of update is represented by the input data received at block 220. In the present example, the updating of the amount associated with the charge line element 404-1 corresponds to a charge data update (that is, an update to a charge line rather than to the status of the charge line within the database 162) rather than a status update. Therefore, at block 230 the server 160 is configured to update the combined data in the database 162 in accordance with the input data. For example, Table 4 illustrates the contents of the database 162 following the above performance of blocks 220-230.

At block 235, the server 160 is configured to determine whether to synchronize the updated data with one or both of the primary and secondary databases 102 and 122. When the determination is negative, the server 160 returns to block 220 (and may perform additional instances of blocks 205-2015 in parallel). The determination at block 235 is made according to a preconfigured set of criteria defining which updates are synchronized and which updates are maintained solely at the database 162 rather than being synchronized with the primary and/or secondary databases 102 and 122. In some examples, the criteria specify simply that all updates to data originally retrieved from the primary are synchronized only to the secondary database 122, but not to the primary database 102. In other examples, updates to certain types of charge lines (e.g. disbursements, but not services fees, or vice versa) can be synchronized. In further examples, block 235 can be omitted, such that no updates to charge line data are synchronized to the databases 102 and 122 following block 230.

Responsive to a negative determination at block 235, the performance of the method 200 returns to block 220. When the determination at block 235 is affirmative, the server 160 performs block 240, at which selected data from the combined database 162 is synchronized to one or both of the primary and secondary databases 102 and 122 prior to returning to block 220. The performance of block 240 will be discussed in greater detail below.

Figure 6:
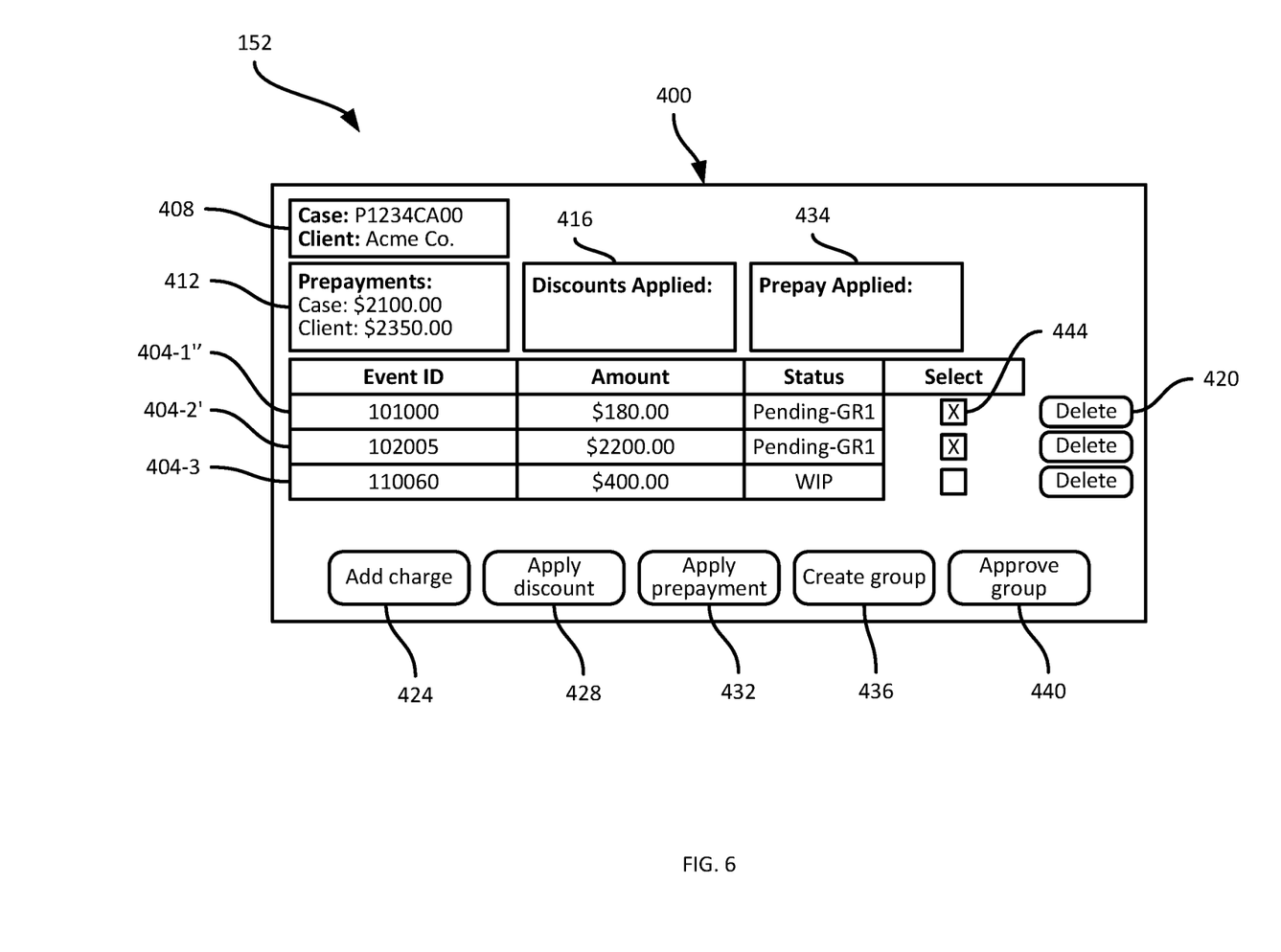

Turning to FIG. 6, a further update to the graphical interface 400 is shown, following receipt of input data at the client device 140 selecting the charge line elements 404-1' and 404-2 (now indicated as 404-1" and 404-2') and subsequently selecting the "create group" element 436. Selection of the "create group" element 436 updates the status of any selected charge line element(s) 404 from "WIP" (i.e. work-in-progress) to "pending" or any other suitable indicator. The status field shown in FIG. 6 also includes a group identifier "GR1". As will now be apparent, the charge line element 404 for a given case identifier can be combined into more than one group (though no single charge element 404 can be a member of multiple groups), and the group identifiers thus serve to distinguish the groups. The pending status indicator shown in FIG. 6 indicates that the charge lines with the pending status indicator and a common group identifier have been selected for use in initiating an update to the secondary database 122, but are not yet in condition for updating the secondary database 122. In the present example, updates to the database 122 are made to reflect invoiced charge lines (i.e. charge lines whose amounts and the like have been finalized for communication to a customer, representing the completed delivery of goods and/or services). Charge lines with the pending status indicator may require, for example, approval before the update to the secondary database 122 is initiated.

As seen in FIG. 2, the status update shown in FIG. 6 leads from block 225 to block 245, at which the above-mentioned group identifier is generated and assigned to the relevant

TABLE 4

| Updated Combined Data | | | | | | |
| --- | --- | --- | --- | --- | --- | --- |
| Case ID | Client ID | Event ID | Amount | Discount | Status | Prepayment |
| P1234CA00 | Acme Co. | 101000 | $ 180.00 | | WIP | $2100.00 |
| P1234CA00 | Acme Co. | 102005 | $2200.00 | | WIP | |
| P1234CA00 | Acme Co. | 110060 | $ 400.00 | | WIP | |
| P1251CA00 | Acme Co. | | | | | $ 250.00 | charge line elements 404, and stored in the database 162. In the present example, following block 245, the server 160 returns to block 220, without synchronizing any data with the primary and/or secondary databases 102 and 122. That is, the status data in the database 162 is updated, but the update is not communicated to the databases 102 and 122. Indeed, the databases 102 and 122 need not contain fields to accommodate the "pending" status indicator or the group identifiers shown in FIG. 6.

Figure 7:
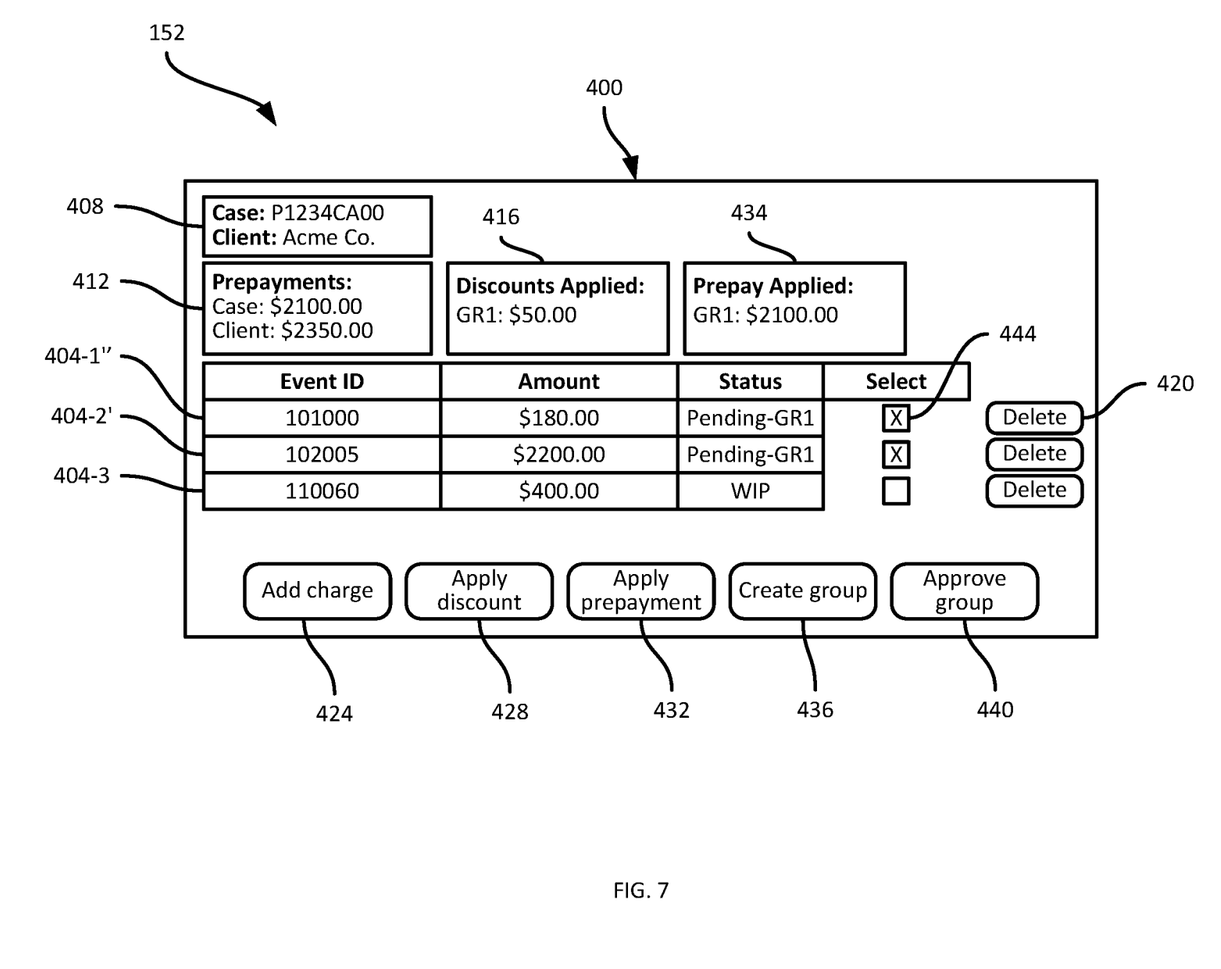

FIG. 7 illustrates the graphical interface 400 following a further performance of blocks 220 and 225, in which both a discount and a prepayment have been applied to the subset of charge elements 404 with the group identifier "GR1". The updates shown in FIG. 7 lead to block 230, at which the database 162 is updated. In the present example, the determination at block 235 is again assumed to be negative, and the performance of the method 200 thus returns to block 220. Following the performance of block 230, Table 5 illustrates the updated content of the database 162.

TABLE 5

Updated Combined Data

| Case ID | Clien . . . | Eve . . . | Amount | Disc. | Status | Prepay Applied | Prepay |
|---|---|---|---|---|---|---|---|
| P1234 . . . | Acm . . . | 101 . . . | $ 180.00 | $50.00 | P . . . GR1 | $2100 | $2100.00 |
| P1234 . . . | Acm . . . | 102 . . . | $2200.00 | | P . . . GR1 | | |
| P1234 . . . | Acm . . . | 110 . . . | $ 400.00 | | WIP | | |
| P1251 . . . | Acm . . . | | | | | | $ 250.00 |

As shown above, the discount and prepayment amounts applied to the subset of charge lines with the group identifier "GR1" are reflected in the database 162. The "prepayment applied" field indicates a prepayment amount applied to the subset, and may not exceed the total prepayment amount for the corresponding client identifier (i.e. $2350, in the above example). In the present example, the prepayment available (the right-most column) is not updated following the performance of block 230. Instead, as discussed below, the prepayment amount available is only updated responsive to a subsequent performance of block 210, following an update to the secondary database 122.

Figure 8:
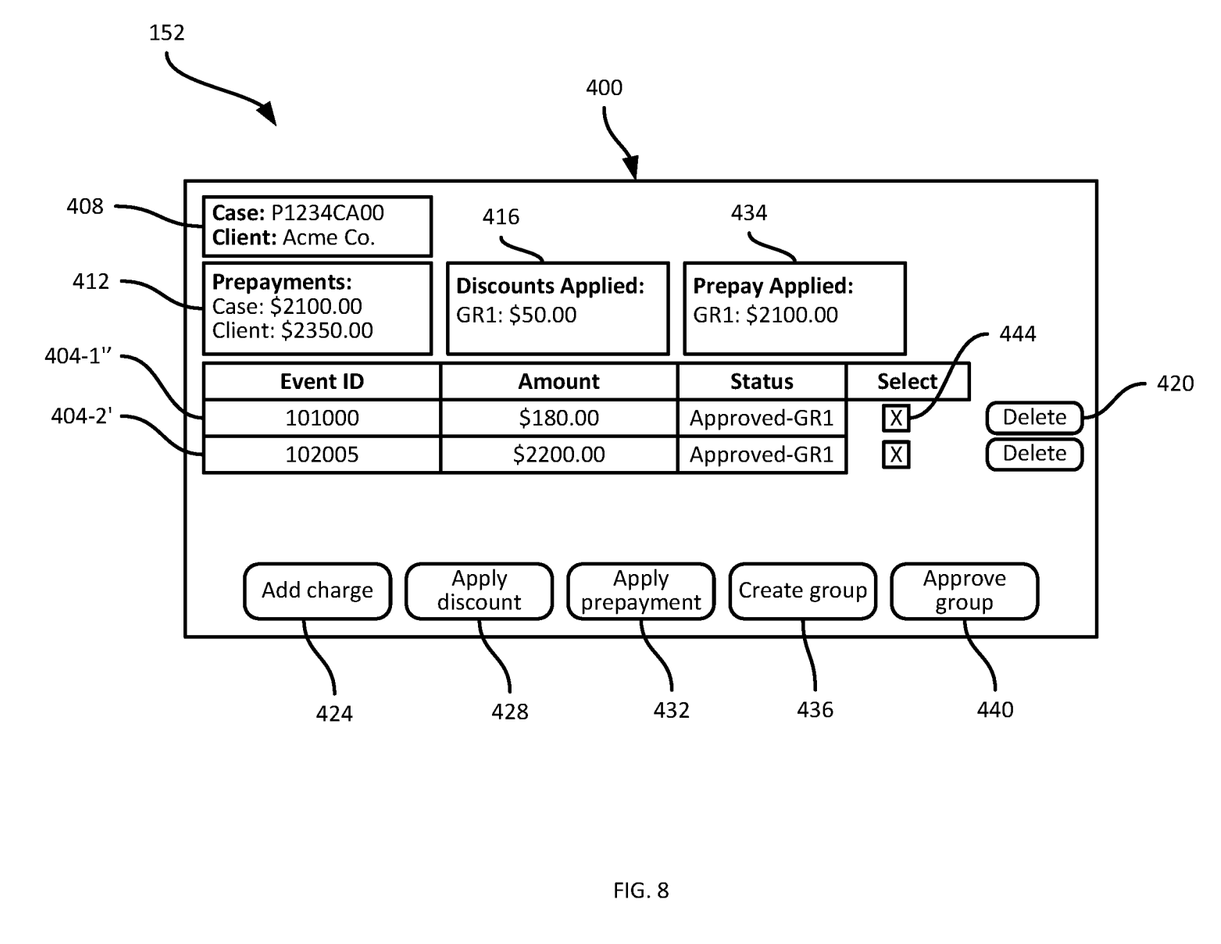

Turning to FIG. 8, a further performance of blocks 220-225 is illustrated. In FIG. 8, however, the retrieval criteria applied at block 220 include a criterion to retrieve only records from the database 162 with the status of "pending". Thus, the charge element 404-3 does not appear in the graphical interface 400. The update made at block 225 in the present example is the selection of the "approve group" element 440, which updates the status of the charge elements 404 having the "pending" status and a common group identifier to "approved". As will now be apparent, prior to selection of the element 440, additional edits can be made to the charge line elements 404. Provision of the element 440 in the graphical interface 400 can be restricted to certain client devices 140 or accounts (i.e. sets of authentication data) in some examples, such that the interface shown in FIGS. 6 and 7, for instance, may lack the approval element 440.

Following selection of the approval element 440, the data corresponding to the charge line elements 404-1" and 404-2' is locked, preventing further edits thereto. The status of the charge line elements 404-1" and 404-2' is then updated to "approved", indicating that an update containing at least a portion of the data associated with the charge line elements 404-1" and 404-2' can now be initiated to one or both of the primary and secondary databases 102 and 122.

At block 250, the server 160 is configured to further update the status of the approved charge lines to "final". For example, approved charge lines can be added to a queue that is processed daily (e.g. at a time selected to reduce peak load on the databases 102 and/or 122) to finalize and perform synchronization. The contents of the database 162 following the performance of block 250 is shown below in Table 6.

TABLE 6

Updated Combined Data

| Case ID | Clien . . . | Eve . . . | Amount | Disc. | Status | Prepay Applied | Prepay |
|---|---|---|---|---|---|---|---|
| P1234 . . . | Acm . . . | 101 . . . | $ 180.00 | $50.00 | Final | $2100 | $2100.00 |
| P1234 . . . | Acm . . . | 102 . . . | $2200.00 | | Final | | |
| P1234 . . . | Acm . . . | 110 . . . | $ 400.00 | | WIP | | |
| P1251 . . . | Acm . . . | | | | | | $ 250.00 |

The server 160 is then configured to perform block 240, at which a preconfigured portion of the data associated with finalized charge lines is selected and sent to one or both of the primary server 100 and the secondary server 120. The server 160 can store, for example with the application 168, a set of field identifiers from the database 162 indicating which data to select, and a corresponding set of field identifiers in the secondary database 122 indicating the destination of the data selected from the database 162. In the present example the fields to be synchronized include the case identifier, client identifier, event identifier, amount, discount amount, and prepayment amount applied, as shown in Table 6 above. The prepayment amount available need not be synchronized. Instead, subsequent activity in the secondary database 122 itself will update the prepayment amount, and a further performance of block 210 will therefore update the prepayment amount available to reflect the application of at least a portion of the amount shown above.

The data transmitted to the secondary database 122 can be formatted in any suitable manner. For example, charge line records, as well as an invoice record can be generated and transmitted to the secondary server 120 at block 240. The charge line records may include the case, client and event identifiers as well as the amounts shown above, while the invoice record can include the discount and prepayment amounts shown above. The invoice record can also include an invoice identifier generated by the intermediate server 162. Similar data may also be sent to the primary server 102, in some examples. In other examples, at block 240 the intermediate server 162 may simply transmit a status update to the primary server 100, to update the charge lines (e.g. those shown in Table 1) to indicate that the charge lines have been finalized and invoiced (i.e. synchronized to the secondary database 122).

The system 10 thus provides a mechanism for initiating updates to a secondary database based on data in a primary database but also requiring data from the secondary database itself and from one or more client devices, while minimizing the need for reconfiguration of either the primary or secondary databases for direct communication or for tracking of synchronization status.

Variations to the above systems and methods are contemplated. For example, in some examples additional synchronization stages can be implemented by the intermediate server 162. For example, the intermediate server 162 can be configured, following retrieval of data from the primary database 102 at block 205, to synchronize at least a portion of the data to the secondary database 122 (e.g. during performance of block 210). At the cost of increased load on the database 122, such additional synchronization provides the secondary database 122 with up-to-date data regarding the provision of goods and/or services, while awaiting the changes in status described above. Further updates to the secondary database 122, in such examples, can await the performance of block 235 or 240.

Various other updates to the data in the combined database 162 are also contemplated. For example, charge lines can be reassigned to other case identifiers (e.g. via a drop-down menu dynamically populated via a request from the intermediate server 162 to the primary server 100 for a list of active case identifiers). As a further example, discounts can be applied to individual charge lines, in addition to or instead of to groups of charge lines.

In further examples, the intermediate server 162 can also be configured, at block 240, to generate and send (via email or the like, according to contact data retrieved from the primary database 102) an invoice document containing the data selected for synchronization to the secondary server 120.

Those skilled in the art will appreciate that in some embodiments, the functionality of any one or more of the applications 108, 128, 148 and 168 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method of initiating updates to a secondary database based on activity in a primary database, comprising:
   retrieving, at an intermediate server, primary data from a primary server hosting the primary database;
   retrieving, at the intermediate server, secondary data from a secondary server hosting the secondary database;
   storing a combined data set including the primary data and the secondary data at the intermediate server;
   responsive to receiving a request from a client device at the intermediate server, presenting a portion of the combined data set to the client device, the portion including (i) a set of values and (ii) a status indicator associated with the set of values;
   receiving, from the client device, input data defining an update to the combined data set and updating the combined data set in a memory of the intermediate server based on the input data;
   determining whether to synchronize the updated combined data set with at least one of the primary server and the secondary server based on (i) when the input data defines an update to the status indicator, whether the status indicator indicates approval of the combined data set, and (ii) whether the input data defines an update to the set of values satisfying synchronization criteria stored at the intermediate server; and
   when the determination is affirmative and the status indicator indicates approval of the combined data set, selecting a subset of the combined data set for transmission to at least one of the primary server and the secondary server.

2. The method of claim 1, wherein presenting a portion of the combined data set to the client device comprises retrieving the portion from a memory of the intermediate server and transmitting the portion to the client device.

3. The method of claim 2, further comprising:
   prior to the presenting, receiving the request containing a selection parameter; and
   retrieving the portion from the memory based on the selection parameter.

4. The method of claim 1, further comprising:
   responsive to selecting a subset of the combined data set for transmission to at least one of the primary server and the secondary server, generating a document containing the subset.

5. An intermediate server for initiating updates to a secondary database based on activity in a primary database, comprising:
   a memory storing an intermediate database;
   a communications interface; and
   a processor interconnected with the memory and the communications interface, the processor configured to:
      retrieve, via the communications interface, primary data from a primary server hosting the primary database;
      retrieve, via the communications interface, secondary data from a secondary server hosting the secondary database;
      store a combined data set including the primary data and the secondary data in the intermediate database;
      responsive to receiving a request from a client device at the intermediate server, present a portion of the combined data set to the client device, the portion including (i) a set of values and (ii) a status indicator associated with the set of values;

receive, from the client device, input data defining an update to the combined data set and updating the combined data set in the memory based on the input data;

determine whether to synchronize the updated combined data set with at least one of the primary server and the secondary server based on (i) when the input data defines an update to the status indicator, whether the status indicator indicates approval of the combined data set, and (ii) whether the input data defines an update to the set of values satisfying synchronization criteria stored at the intermediate server; and when the determination is affirmative and the status indicator indicates approval of the combined data set, select a subset of the combined data set for transmission to at least one of the primary server and the secondary server.

6. The intermediate server of claim 5, wherein the processor is further configured to present a portion of the combined data set to the client device by retrieving the portion from a memory of the intermediate server and transmitting the portion to the client device.

7. The intermediate server of claim 6, wherein the processor is further configured to:
   prior to the presenting, receive the request containing a selection parameter;
   retrieve the portion from the memory based on the selection parameter.

8. The intermediate server of claim 5, wherein the processor is further configured to:
   responsive to selecting the subset of the combined data set for transmission to at least one of the primary server and the secondary server, generate a document containing the subset.

* * * * *